June 7, 1949.  J. F. STEVENSON  2,472,630
COVER MEANS FOR VEGETABLES AND OTHER PLANTS
Filed Oct. 27, 1943  8 Sheets-Sheet 1

INVENTOR
John Ferguson Stevenson
By Otto Munk
his ATT'Y.

June 7, 1949.  J. F. STEVENSON  2,472,630
COVER MEANS FOR VEGETABLES AND OTHER PLANTS
Filed Oct. 27, 1943  8 Sheets-Sheet 2
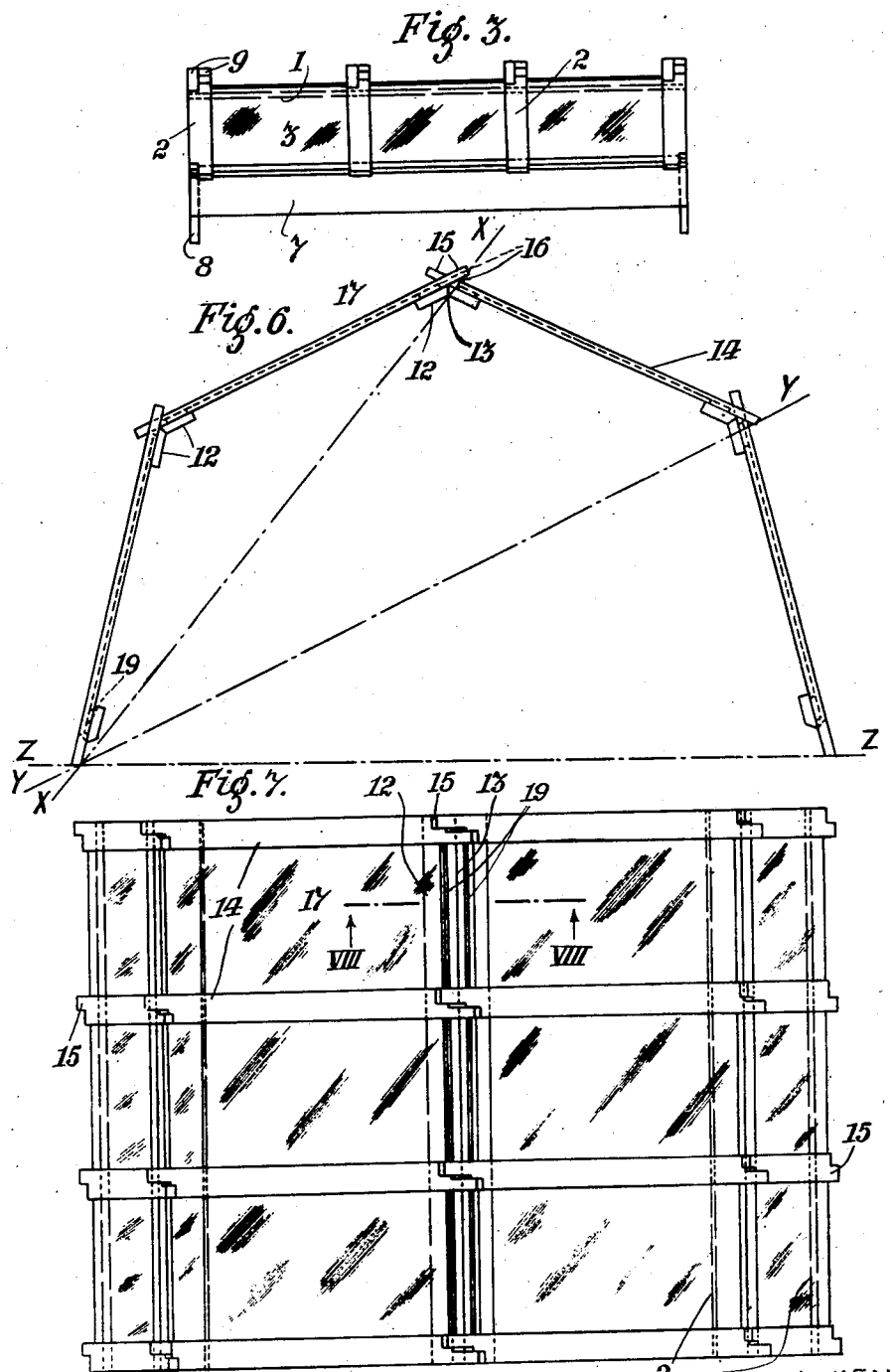

June 7, 1949. J. F. STEVENSON 2,472,630
COVER MEANS FOR VEGETABLES AND OTHER PLANTS
Filed Oct. 27, 1943 8 Sheets-Sheet 3
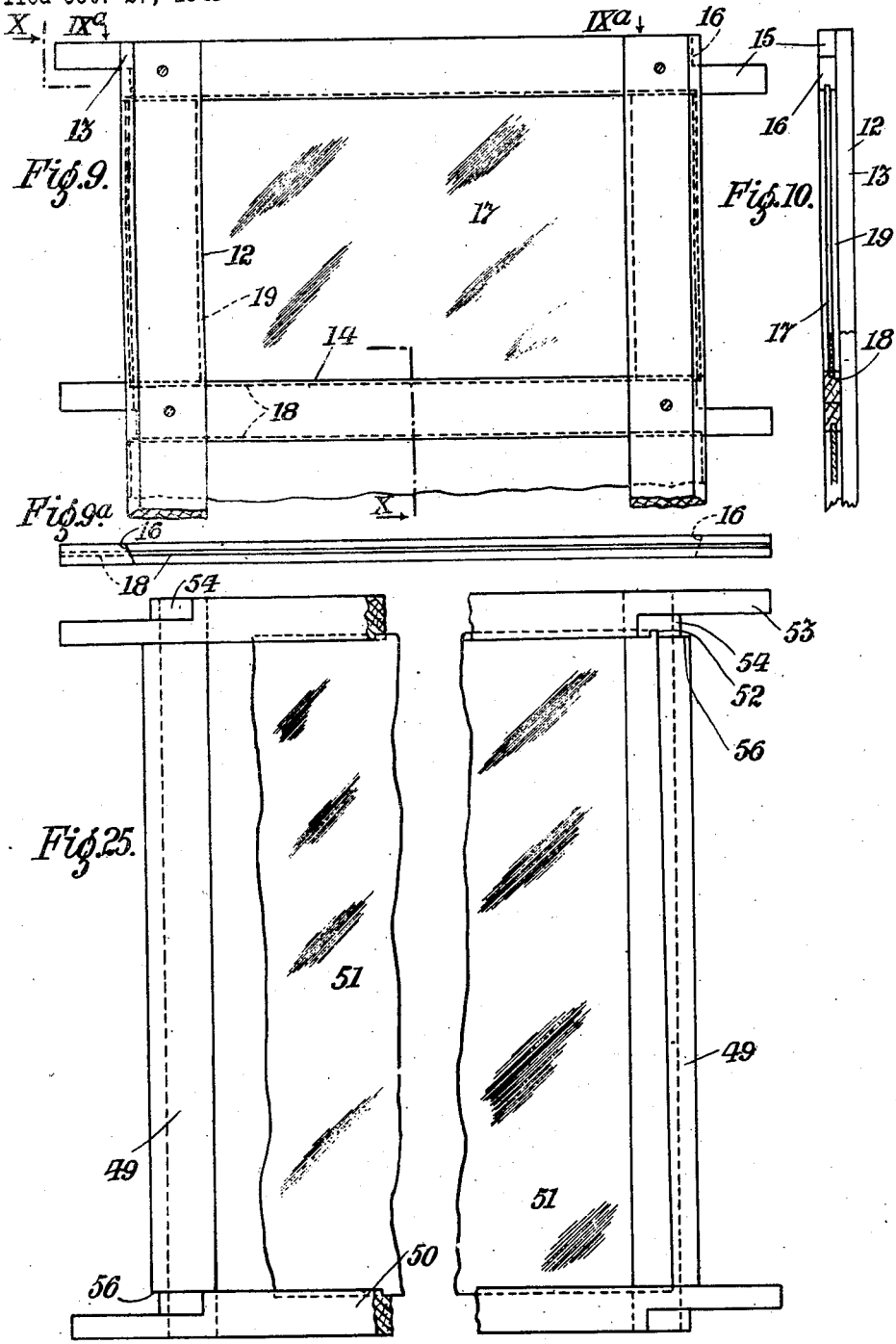

June 7, 1949. J. F. STEVENSON 2,472,630
COVER MEANS FOR VEGETABLES AND OTHER PLANTS
Filed Oct. 27, 1943 8 Sheets-Sheet 4
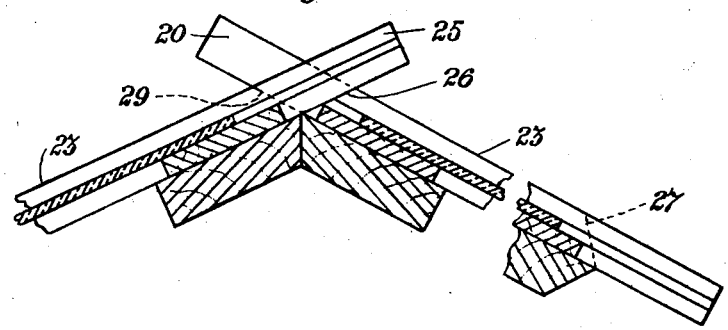
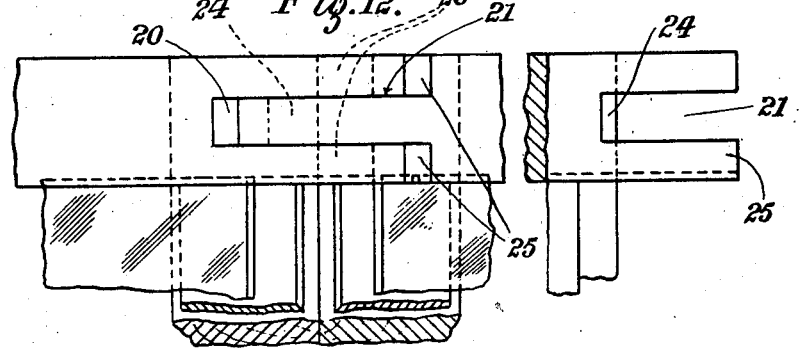
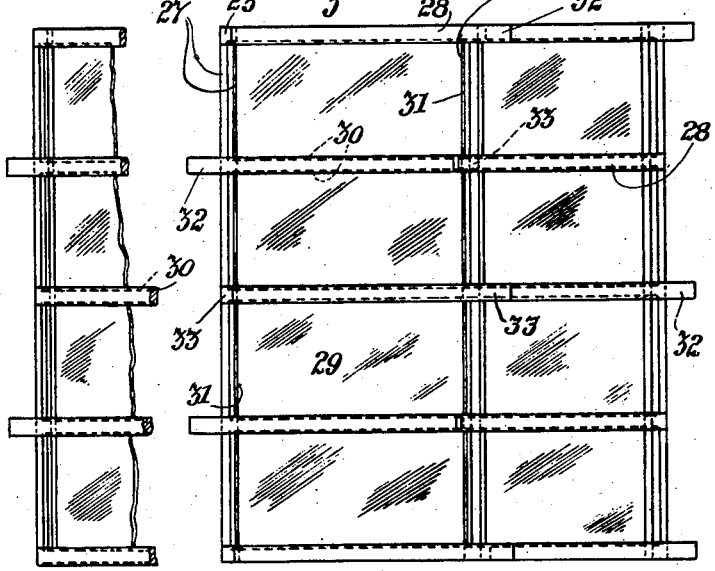
INVENTOR
John Ferguson Stevenson
By [signature]
his ATTY.

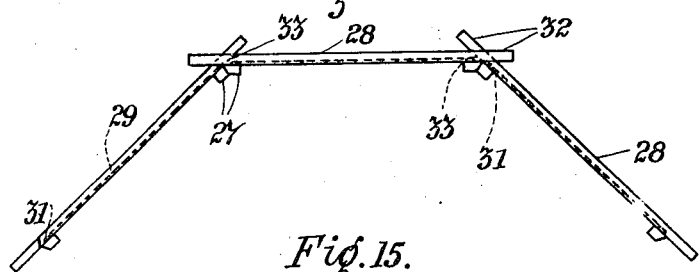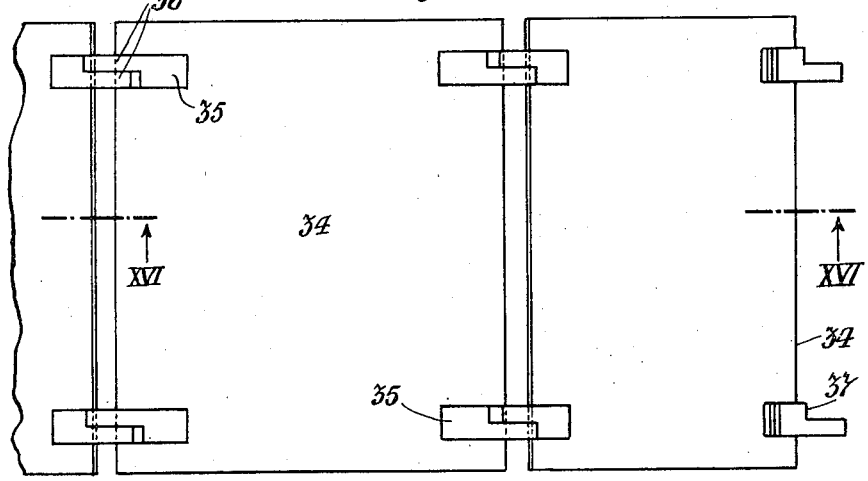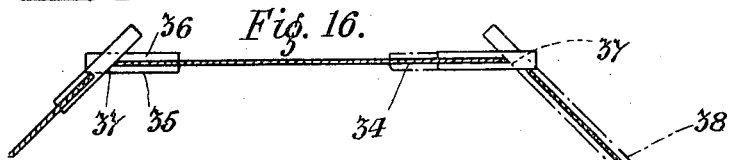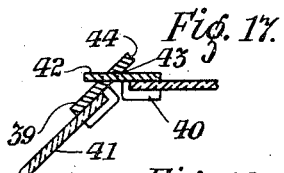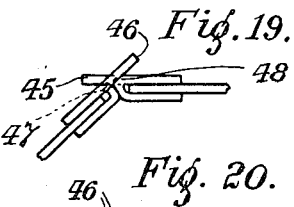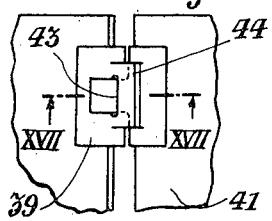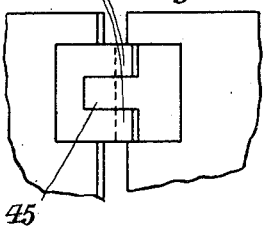

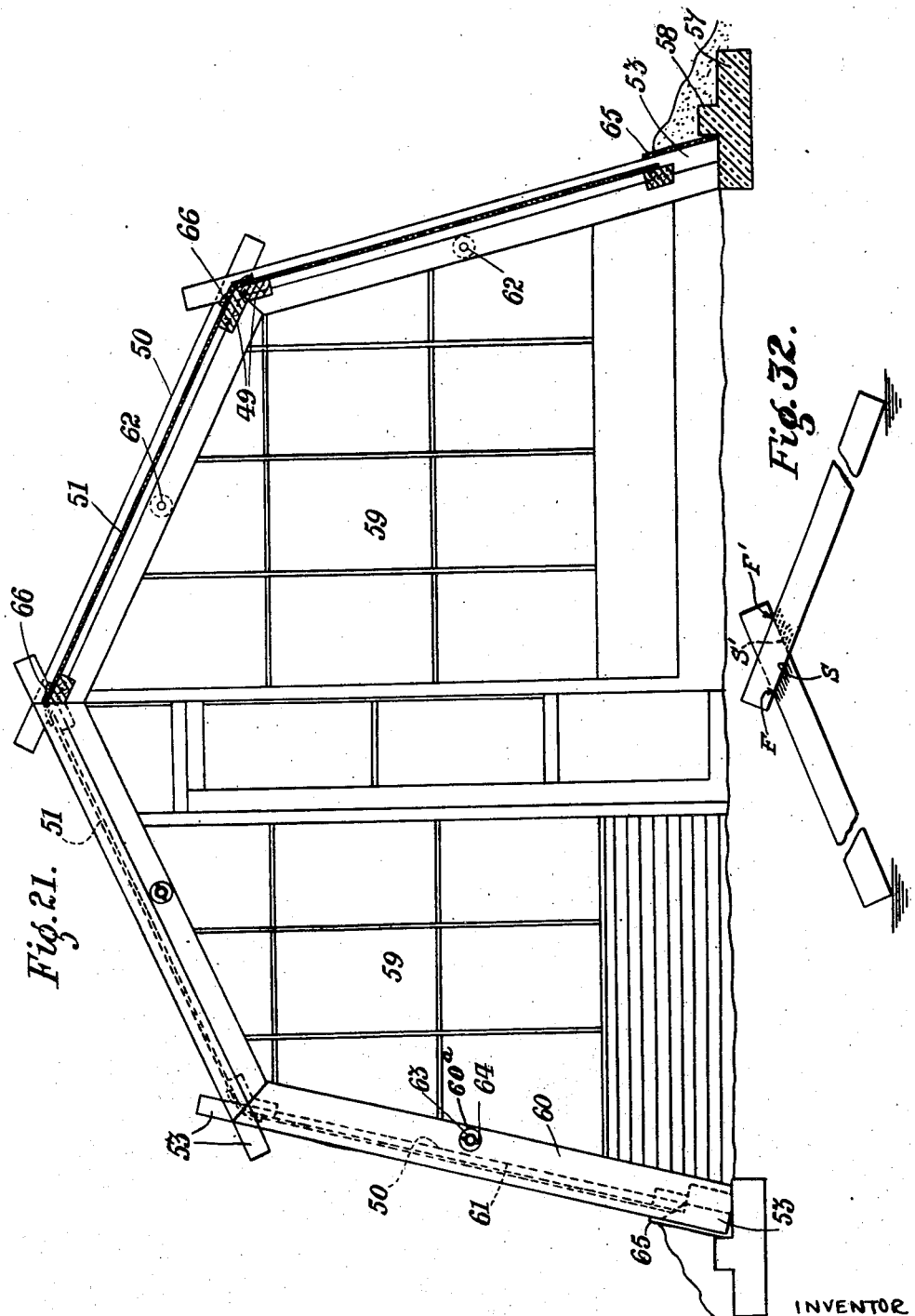

June 7, 1949. J. F. STEVENSON 2,472,630
COVER MEANS FOR VEGETABLES AND OTHER PLANTS
Filed Oct. 27, 1943 8 Sheets-Sheet 7

INVENTOR
John Ferguson Stevenson
By [signature]
his ATTY.

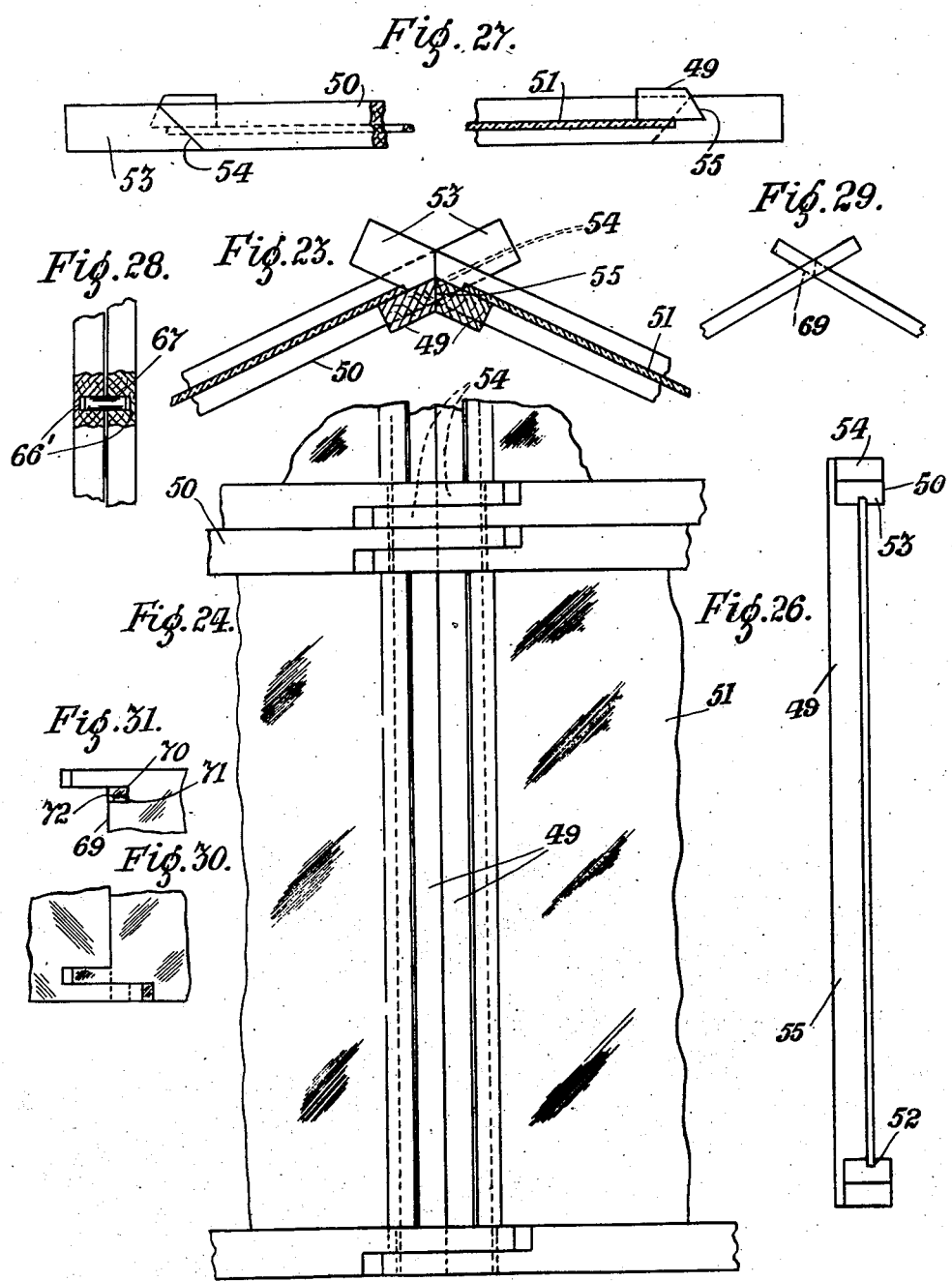

Patented June 7, 1949

2,472,630

UNITED STATES PATENT OFFICE 2,472,630

COVER MEANS FOR VEGETABLES AND OTHER PLANTS

John Ferguson Stevenson, Belfast, Northern Ireland

Application October 27, 1943, Serial No. 507,798 In Great Britain November 18, 1942

19 Claims. (Cl. 47—29)

This invention relates to cover means such as cloches, frames, glasshouses and the like which are used to protect vegetables or other plants.

One object of the invention is to provide cover means for plants comprising a plurality of cover or frame members having means at interconnectable edges thereof whereby the members can be separably attached edge to edge to form a bridge-like, roof-like or equivalent covering structure, said means being adapted to lock the members against, or adapted to limit, relative angular movement in either or both directions.

A further object of the invention is to provide cover means for plants comprising a plurality of cover or frame members and means at interconnectable edges thereof whereby the members can be separably attached edge to edge to form a bridge-like or roof-like covering structure, said means comprising projections spaced along the adjacent edges of the members so as to intermesh or cross each other when the sides are set together and bearing surfaces on or parts of the members adapted to be engaged by the corresponding projection or projections on the other member to prevent further relative angular or flattening movement of the members beyond a predetermined angle of preferably substantially less than 180°.

A further object is to provide cover means in which each frame member comprises a longitudinal member at the interconnected edge and the opposite edge and transverse members running between said longitudinal members characterised in that some or all of said transverse members are extended to form said projections.

A further object of the invention is to provide cover means which comprise two or more cover or frame members each of the two or of the two outer members having, at the edge or side opposite the interconnectable edge, soil-engaging means or being so shaped at said edge or side as to maintain the members sufficiently clear of the soil to provide head room for the plants throughout the area of the two members.

A further object of the invention is to provide for a glasshouse a covering structure which comprises a plurality of single bridgelike structures and means for detachably clamping the structures together to form a composite, continuous and rigid bridgelike structure, each single bridgelike structure comprising a plurality of frame or cover members having means at interconnectable edges thereof whereby the members can be separably attached edge to edge to form a single bridgelike structure, said means being adapted to lock the members against relative angular movement in either or both directions.

In order that the invention may be clearly understood it will now be described, but merely by way of example, with reference to the accompanying drawings in which:

Figs. 1, 2, and 3 are respectively end, plan and side views of a pair of frame members forming a covering structure in accordance with the invention.

Figs. 6 and 7 are respectively end and plan views of four further frame members forming a covering structure in accordance with the invention.

Figs. 9 and 10 are respectively plan and side views to a larger scale of a frame member as in Figs. 6 and 7 and Fig. 9A is a detail view of a transverse member.

Fig. 11 is a cross sectional detail of an alternative form of interlocking projections and Fig. 12 is a corresponding plan view.

Fig. 13 is a broken plan view of a further form of frame member forming a covering structure in accordance with the invention and Fig. 14 is a corresponding end view.

Fig. 15 is a broken plan view of cover members forming a covering structure in accordance with the invention and Fig. 16 is a corresponding sectional view on the line XVI—XVI of Fig. 15.

Figs. 17 and 18 are respectively sectional and plan views of interlocking projection means alternative to that in Figs. 15 and 16.

Figs. 19 and 20 are similar views of further interlocking projection means alternative to that in Figs. 15 and 16.

Fig. 21 is an end view partly in section of a complete glass house formed of frame members in accordance with the invention and Fig. 22 is a corresponding side view.

Fig. 23 is a sectional view to a larger scale of the interlocking projection means in Figs. 21 and 22 and Fig. 24 is a corresponding plan view.

Figs. 25, 26 and 27 are respectively plan, side and end views of a frame as used in Figs. 21 and 22.

Fig. 28 is a detail view and Fig. 29 is an elevation of a further modification while Figs. 30 and 31 are corresponding plan views, Fig. 32 is a diagrammatic view of the interlocking projections and bearings.

Figure 4:
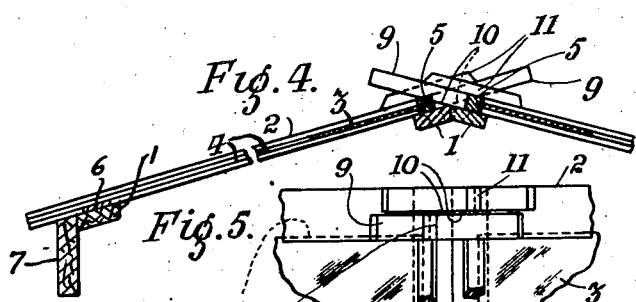
Fig. 4 is a cross sectional view to a larger scale on the line IV—IV of Fig. 2

Referring to Figs. 1 to 5, the roof components of the covering structure consist of two identical frames each consisting of two wooden longitudinals 1 formed by four transverse wooden members 2 attached by nails or otherwise on top of the longitudinals. The glass panes 3 have their transverse edges supported in grooves 4 (Figs. 4 and 5) in the members 2 and their inner longitudinal edge supported in the grooved spacers 5 while their lower longitudinal edges are supported on the spacers 6. The grooves in the members 2 extend to the outer ends thereof so that the panes can be slid into and out of position. In Fig. 4 lower portions of the panes 3 are shown broken off to reveal the grooves 4.

The wall components are constituted by downward extension means such as a skirt provided at the outer longitudinal edge of each frame at an angle of substantially more than 90° and consisting of a board 7 extending from one end to the other and at each end thereof soil-engaging legs 8 are attached, being attached in recesses in the longitudinals 1 and members 2.

The frames are detachably attached or interlocked at an angle of about 150° at their inner longitudinal edges and this is effected by extending each member 2 in the form of a half width projection 9 and forming an inclined bearing surface 10 on the end of the other half of the member 2 at the base of the projection. The projections 9 are strengthened by bars 11 and the abutting faces of the members 1 are suitably inclined so as to abut flat against each other.

Figure 2:
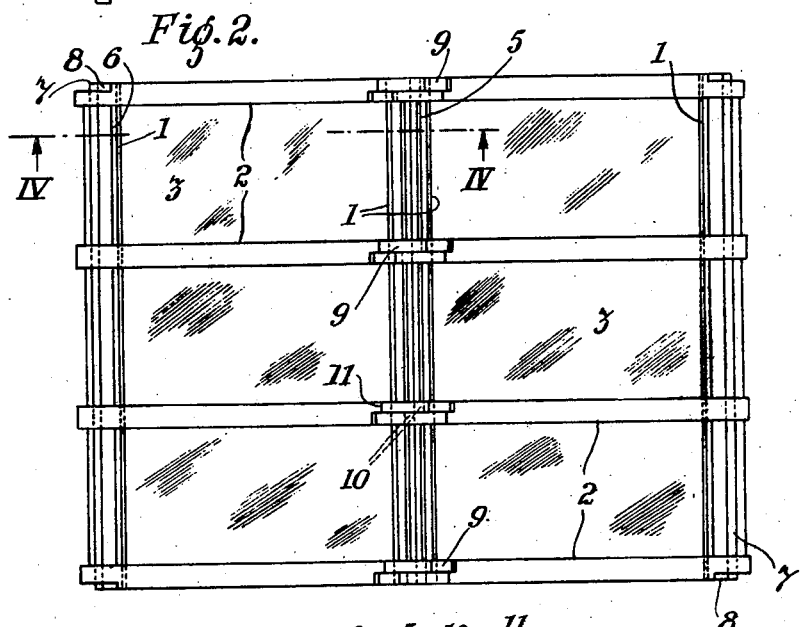

It will be seen that the projection 9 of one member 2 engages scissorwise with the projection of the corresponding member 2 and at the maximum or limit angle as shown in Figs. 2 and 4 rests flat on or substantially flat on the bearing surface 10 of the corresponding member 2. The angle between the projections, in the example 150°, is sufficient to ensure that the frames are frictionally locked under their own weight at evenly spaced points along their length against collapse or flattening movement. As will be explained later this angle may be altered but not to less than a minimum angle below which the frictional lock would not be obtained. Such angle is hereinafter referred to as the "limit angle." In addition to being locked by the projections 9 and bearing surfaces 10 against relative angular movement the members 2 are in effect locked or gripped together against slipping apart by the engagement of the projections and bearing surfaces. The skirt is of a suitable height to provide head room for plants right to the outer edges of the frames and the legs 8 serve to engage the soil and maintain the frames from slipping when they are set at less than full width or angle. They may also serve to keep the skirt slightly clear of the ground for ventilation. A suitable size for the frame members, which is given merely by way of example, is four feet longitudinally and two feet transversely.

Figure 1:
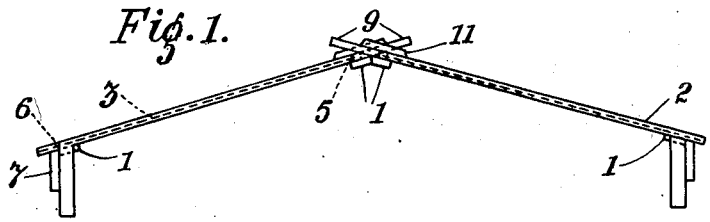

To form a continuous cloche any desired number of cover structures, as shown in Figs. 1 and 3, are set endwise in a row and the ends of the row may be closed in any suitable manner. For watering purposes the skirt 7 of one frame may be raised and owing to the interlocking of the projections 9 and surfaces 10 when at a frictionally locking angle to each other both frames can be conveniently tilted in this way about the opposite skirt to allow convenient access. Ventilation may be provided for by leaving a space between the adjacent ends of adjoining structures.

With the frames described and shown the width in relation to the height can be substantially greater than with the existing wire frame V or barn cloches so that a greater proportion of ground can be covered with less glass than hitherto. Moreover the frames are easily separable, easy to move and can be safely stored.

Referring to Figs. 6 to 10, the covering structure consists again of two roof components and two wall components, but in this construction the components are four identical frames. Each frame consists of two wooden longitudinals 12 having inclined abutting surfaces 13 and joined by four upper transverse members 14 having half width projections 15 and inclined bearing surfaces 16 at each end whereby the frames can be detachably interlocked at the limit angle as already described with reference to Figs. 1 to 5. The glass panes 17 are slid into grooves 18 in the members 14 and the longitudinal ends are supported on spacers 19. If two only of the frame members were inter-attached (as indicated in Fig. 6 where the line X—X denotes the ground surface) in the absence of a wall component at each side (such as a skirt and projections as in Fig. 1) each frame would make an unduly acute angle with the ground and there would be inadequate headroom near the sides of the frames. By using three frames or four frames in accordance with the present invention, the lines Y—Y and Z—Z respectively denoting the ground surface, adequate headroom throughout the area covered by the roof component or components is obtained. In the case of three or more frame members when the members assume the limit angle to each other they are automatically interlocked by their own weight to form a rigid structure provided the limit angle and the number of frames is such that the frames engaging the ground are substantially sloped inwards from their lower edges. In the example shown the limit angle is about 130° but this may be altered to any suitable angle less than 180° by altering the slope of the bearing surfaces 16. In these three or more frame structures the two outer frames constitute the wall components and are equivalent to the skirts in Figs. 1 to 5 in that they support the roof component or components (formed by the intermediate frame or frames) so as to provide adequate headroom across the full width of the roof.

As in the preceding example a plurality of covering structures as shown in Figs. 6 and 7 may be set end to end to provide a continuous cloche or elongated covering structure. In a typical example the frames are about 4′ by 2′ which in the four frame structures shown gives a height of about 3′ and a base width of about 5′, but it will be understood that the size of the frames may be varied.

As the frames are identical they are interchangeable and easy to manufacture and they can be readily moved and stored. Further, owing to the projections 15 and bearing surfaces 16 at one end of each transverse member 14 being at opposite sides from those at the other end, it is possible to attach either edge of one frame to either edge of another frame. Thus, for instance, if the projections at one edge are damaged the frame can still be used provided that edge is put to the ground.

Figs. 11 and 12 show a modified form of interlocking projection that can be used in the arrangement as shown in Figs. 6 and 7 and in Figs. 1 to 3. The construction of the frame members is the same as in Figs. 6 to 10 except that each transverse member 23 has at one end a central projection 20 of reduced width and a corresponding slot or recess 21 at the other end between two projections 25. The slot has an inclined bearing surface 24 adapted to be engaged by the projection 20 and on each side of the projection 20 the transverse member has inclined bearing surfaces 26 adapted to be engaged by the projections 25. The interlocking action is the same as in Fig. 8 except that the engagement of the projection 20 between the projections 25 positively prevents relative endwise movement between the frames. It will be understood that all of the interlocking projections in Figs. 1 to 10 may be as in Figs. 11 and 12 and that the arrangement shown in Figs. 11 and 12 is also suitable for frames having heavier end transverse members in which case, the intermediate transverse members, if any, need not have interlocking projections.

In Figs. 13 and 14 the identical frame members each consist of two wooden longitudinals 27 joined in this case by five transverse wooden members 28 adapted to receive four panes 29 which are slid into slots 30 in the members 28 and supported at their longitudinal edges on the spacers 31. The members 28 are extended at alternate ends to form full width projections 32 while the other ends are chamfered or inclined to form the bearing surfaces 33 for the projections 32 of the corresponding members 28 of the adjacent frames. It will be understood that the projections 32 and bearing surfaces 33 of any two pairs of adjacent transverse members 28 of two attached frames form an interlock which operates as previously described and that the construction is simplified in that the members 28 are not reduced in width to form the projections. It is usually necessary, however, to use longitudinals for the abutting edges which are more rigid than those necessary for the preceding examples so as to resist the bending stresses set up in the longitudinals due to the interlocking action. It will also be understood that to give a self-supporting structure there must at least be three pairs of engaging projections 32 and bearing surfaces 33, that is, the frame members, where the projections are formed by extensions of the transverse members 28, have to consist of at least two panes with at least three transverse members. The structures as shown in Figs. 13 and 14 may be formed into continuous cloches or elongated covering structures as previously described and three or more frames may be used as shown in Figs. 6 and 7 to form the covering structure.

In Figs. 15 and 16 each cover member consists of a sheet of glass or other suitable material 34 having at each of two opposed edges two members 35 of wood or other suitable material which have slots 36 whereby they are fitted on to and grip the sheet. Each member 35 has a half width projection 36 and inclined bearing surface 37 so that they can be detachably interlocked as previously described with reference to the preceding examples.

In Figs. 17 and 18 a modification of the arrangement in Figs. 15 and 16 is shown. Here the members 39 and 40 are of metal or the like bent round or clamped to the edge of the sheet 41. The member 40 has a projection 42 engaging a slot 43 in the projection 44 of the member 39. The engagement of the projection 42 with the upper and lower bearing surface or edge of the slot interlocks the sheets at the maximum angle shown. In this case the bearing surface is of much smaller area.

Figs. 19 and 20 show a similar arrangement to the preceding one except that the locking is effected by the projections 45 and the spaced projections 46 respectively engaging the bearing edges or surfaces 47 and the bearing edges or surfaces 48. The locking effect is similar to that in Figs. 11 and 12 but the bearing surfaces are of much smaller area.

The structures shown in Figs. 15 to 20 are especially suitable for forming continuous garden cloches or smaller covering structures, and each structure may be formed of two, three or more cover members.

Figure 22:
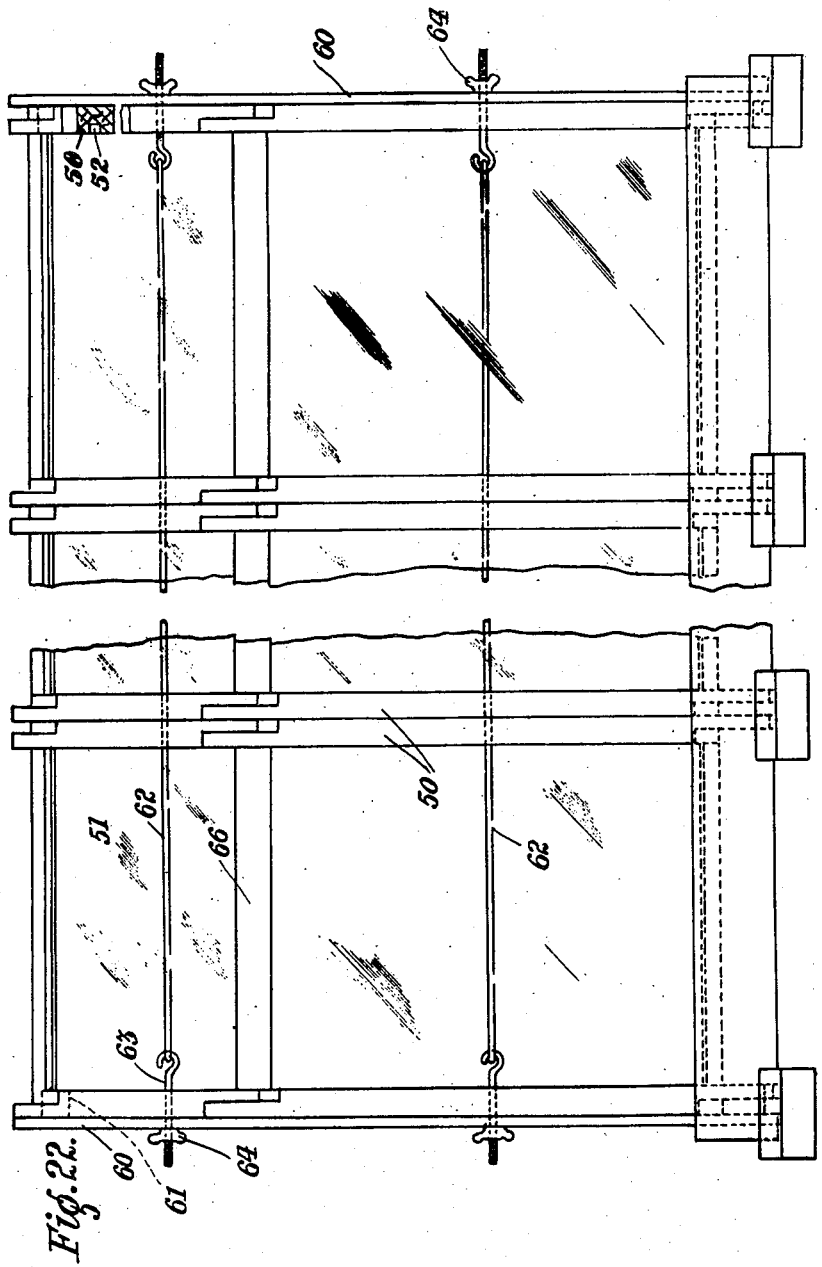

Figs. 21 and 22 show a larger structure namely a glasshouse constructed from frame members such as Dutch lights modified in accordance with the invention as shown in Figs. 23 and 27. Each light consists as usual of the two longitudinals 49 and two transverse (larger) members 50, the glass panes 51 being supported on the longitudinals 49 and in grooves 52 in the members 50.

The ends of the members 50 are extended to form half width projections 53 at the foot of which inclined bearing surfaces 54 are formed on the ends of the members. The longitudinals 49 have inclined meeting faces 55 and from Figs. 23 and 24 it will be seen that any two lights can be detachably interlocked with the projections 53 and surfaces engaging scissorwise as previously described. It will also be noted that the longitudinals 49 provide a bearing surface 56 (see especially Fig. 25) which engages the corresponding projection 53 of the attached light and prevents relative endwise movement between the lights.

Each four frames form a rigid arched structure as already described with reference to Figs. 6 and 7 and a plurality of these are set closely end to end, the projections 53 being supported on bricks 57 having central ridges 58. Any number of such structures, may be so positioned and the composite structure is closed at the ends by glazed walls 59 surrounded by framing boards 60 having internal battens 61 forming a frame which fits into the frame formed by the end members 50 of each end arched structure. The end walls and the arched structures are firmly clamped together by tie wires or the like 62 extending inside close to the lights and attached at their ends to hooks or screwed rods 63 extending through the battens 61 and boards 60 and threaded plates 60a and engaged by thumb screws or the like 64 whereby the necessary clamping pressure may be applied. The lower side edges of the structure may be closed by boards 65 against which earth may be piled. The tie wires may be otherwise disposed and the number thereof may be varied. There may be three disposed along each of the apices between the four lights or they may be disposed outside the lights or they may be disposed inside in suitable positions to serve for the training of tomato or other plants.

To exclude moisture lead or the like strips 66 are provided along the apices where the longitudinals 49 abut.

Dutch lights may for example be about 5' by 3' so that a house as shown consisting of say five arched structures will be about 15' long and about 6½' high at the centre. It will thus be seen that the invention provides a commodious glasshouse that can be readily assembled and taken down and which is built largely of identical frame members.

Projection and recess means may be provided on the abutting edges of adjacent arched structures, the said means being held in engagement by the effect of the clamping means and so keeping the arched structures in longitudinal alignment. As shown in Fig. 28 said projection and recess means may consist, for example, of dead end holes 66' in the abutting edges of the side members 50 of the frame members and removable dowel pins 67 adapted to be engaged in said holes so as to keep the arched structures in longitudinal alignment.

The frame members shown in all of the drawings are of wood but it will be understood that any other suitable material may be used, for example, plastic or metal.

Instead of glass opaque panes may be provided in any of the examples shown where the cover means is to be used for forcing. In this case the cover members may simply consist of sheets of opaque material, for example of asbestos or plastic having the interlocking projections formed thereon as shown in Figs. 29 to 31. The edges 69 of the sheets may be inclined to abut flush and have notches 70 to receive the projections of the adjacent sheet, these notches consisting of the inclined bearing surface 71, shoulder 72 and side of the projection. It will be understood that these projections will prevent relative endwise movement of the sheets.

Where the cover means are simply to protect plants against birds the glass may be replaced by netting. It is to be understood that the term "bearing" as used in the following claims covers not only flat surfaces of substantial area as shown for example, in Figs. 4 and 5 and Figs. 8 and 8A but smaller surfaces or areas such, for example, as edges in Figs. 17 to 19. So far as the frictional interlocking effect is concerned the effective area of the bearing is not critical. The essential purpose of the bearing is to form a fulcrum for the corresponding projection. Referring, for example, to Fig. 32 which is diagrammatic, if the right hand frame tends to slip outwards at its outer edge along the ground its top end will tend to fall about a curved path. That is to say, the right hand frame tends to execute a movement including a counterclockwise angular movement about the top edge F of the bearing surface S of the left hand frame, but this angular movement is resisted by the bearing surface $S^1$ (or the top edge $F^1$ thereof) on the right hand frame engaging or pressing against the corresponding projection of the left hand frame. Similarly the left hand frame will tend to execute a clockwise angular movement about the top edge $F^1$ of the other frame's bearing surface $S^1$ but this tendency will also be opposed by the engagement of surface S and the projection on the right hand frame. Thus the two tendencies to rotate about the spaced potential pivots F and $F^1$ oppose each other and cause the projections and bearings to grip frictionally together under the effect of the weight of the frames. Thus it will be understood that the area of the bearings serving as opposed fulcrums is not critical but in some cases it might be desired to have a substantial area as in Fig. 5 or 8.

Figure 5:
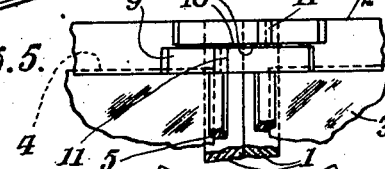
Fig. 5 is a corresponding plan view.
Figures 8, 8A:
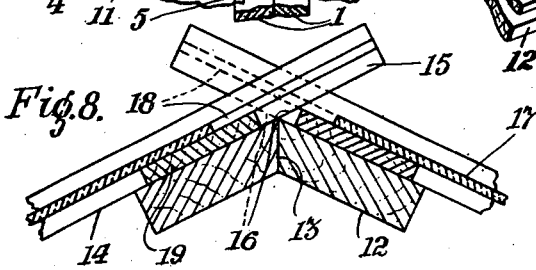
Fig. 8 is a cross sectional view to a larger scale on the line VIII—VIII of Fig. 7.
Fig 8A is a perspective view, corresponding to Fig. 8 and showing an end of an upper transverse member and associated parts with the associated glass pane removed for clearness.

For instance in the case of wood which might become crushed or deformed, it is desirable to use for bearings the flat inclined surfaces 10 or 16 as in Fig. 5 or 8. Probably the pressure is concentrated more or less towards the potential pivots represented by the top edges F and $F^1$ but it is found that such surfaces or top edges formed at the angle shown amply resist crushing and consequent further spreading or flattening of the frame beyond the angle for which they are made to be set, which spreading would be a substantial disadvantage in the formation of the continuous cloches as the several units might adopt different angles.

In other cases, for instance, where metal is used (as in Figs. 17 and 18) it may be desirable to have a smaller area of an edge giving a biting effect due to the concentration of pressure.

The limit angle between the projections appears to depend inter alia on the angle of pressure and the friction between the bearing surfaces and the projections at the fulcrums. With the interlock in Figs. 17 and 18 where the projection enters between the two bearing surfaces or edges an interlock may be obtained at smaller angles than in Fig. 1 or 6. In the cases of structures formed of three or more withdrawably attached frames the angular setting must also be chosen in the light of the necessity for the outer frames to slope upwards and inwards sufficiently to make the structure adequately resist side pressure and sidewards collapse.

With the arrangement as in Fig. 1 the skirts or other side supports of the outer edges of the frames give sufficient headroom throughout the width of the structure and at the same time enable the choice of a frictional locking angle substantially greater than the limit angle.

What I claim is:

1. A cover means for plants comprising a plurality of cover or frame members having interconnectable edges and complementary interlocking means at said edges whereby the members can be separably attached edge to edge to form a rooflike covering structure, said means comprising projections spaced along the adjacent edges of the members so as to cross each other when the edges are set together and bearing means on each member adapted to be engaged by the corresponding projections on the other member to prevent further relative angular or flattening movement of the members beyond an obtuse angle, and an integral soil-engaging skirt set at an angle at the remote edge of each cover or frame so as to maintain plant head room at said edge.

2. A substantially plane frame member for horticultural cover means comprising a longitudinal at one edge and a soil engaging skirt set at an angle at the other edge so as to maintain sufficient head room for plants at said other edge, transverse members extending from said skirt to said longitudinal to form sheet-receiving subframes and extending beyond said longitudinal to form projections to enable the frame member to be detachably interlocked with a similar frame member to form a self-locking and self-supporting rooflike covering structure.

3. A frame member as claimed in claim 2, in which transverse members extend over the longitudinal and the projections are half the width of the transverse member and have an inclined bearing surface at the foot of the extension adapted to receive scissorwise the corresponding projection of the other frame and in which the outer edge of the longitudinal is chamfered to engage flatly with the chamfered edge of the longitudinal of the other frame when two frames are interlocked.

4. An arched cover structure for plants comprising at least three adjoining portable components of which at least one component forms a roof and of which two components form side supports or walls high enough to provide headroom for plants throughout the area covered by the roof and of which at least two adjoining components are adapted for withdrawable inter-attachment by the provision along adjacent edges of spaced projections and bearings whereby these two adjoining components can be withdrawably engaged at an obtuse angle to one another with each projection on one of them engaging a cooperating bearing or bearings on the other of them, the bearings being disposed to function as opposed fulcrums for the projections and to grip the projections frictionally under the weight of these components against flattening of the angular relationship and against slipping apart, so that the several components by virtue of said projections and bearings constitute a self supporting structure when supported at the lower edges of the supports or walls.

5. An arched cover structure as claimed in claim 4, in which the roof is constituted by two adjoining cover components adapted for said withdrawable inter-attachment at adjacent inner edges and in which the two components forming the side supports or walls are constituted by downward extension means on the respective cover components at the outer edges thereof.

6. An arched cover structure as claimed in claim 4, in which the roof is formed by a cover component and in which the two components forming the side supports or walls are adapted for said withdrawable attachment at their upper edges with the outer edges of the roof, the obtuseness of the angles between the roof and the side supports or walls being such that the side supports or walls are sloped inwards from their lower edges to prevent sidewards collapse of the structure.

7. An arched cover structure as claimed in claim 4, in which the roof is formed by a plurality of cover components adapted for said withdrawable inter-attachment at adjacent edges and in which the two components forming the side supports or walls are adapted for said withdrawable attachment at their upper edges with the outer edges of the roof, the obtuseness of the angles between the roof and the side supports or walls being such that the side supports or walls are sloped inwards from their lower edges to prevent sidewards collapse of the structure.

8. An arched cover structure as claimed in claim 4, in which each withdrawably attached component comprises a longitudinal member at the attached edge and at the opposite or outer edge and transverse members running between said longitudinal members, there being transverse members on at last one component which are extended at both ends to form said projections to adapt that component for said withdrawable inter-attachment at both edges.

9. An arched cover structure as claimed in claim 4, in which each withdrawably attached component comprises a longitudinal member at the attached edge and at the opposite or outer edge and transverse members running between said longitudinal members and being extended to form said projections and in which the projection is only part of the width of the transverse member and the bearing is formed by a surface located in said member at the base of the projection, the projection and bearing surface being located so as to engage in scissors fashion with the bearing surface and projection of the corresponding transverse member of the adjoining component to allow identical components to be detachably attached with their ends or end-forming transverse members flush so that a plurality of arched cover structures can be set end to end without spaces therebetween to form a continuous closed structure.

10. An arched cover structure as claimed in claim 4, in which each withdrawably attached component comprises a longitudinal member at the attached edge and at the opposite or outer edge and transverse members running between said longitudinal members, and at least some of which transverse members are extended at both ends to form said projections and in which the projection is only part of the width of the transverse member and the bearing is formed by a surface located in said member at the base of the projection, the projection and bearing surface being located so as to engage in scissors fashion with the bearing surface and projection of the corresponding transverse member of the adjoining component to allow identical components to be detachably attached with their ends or end-forming transverse members flush so that a plurality of arched cover structures can be set end to end without spaces therebetween to form a continuous closed structure, the projection being half or approximately half the width of the transverse member and the projection at one end being at the opposite side of the member to the projection at the other end so that either edge of a withdrawably attachable component may be so attached with either edge of another.

11. An arched cover structure for plants comprising two frames constituting two roof-forming components adapted for withdrawable inter-attachment along adjacent edges by the provision along said edges of spaced projections and bearings whereby the frames can be withdrawably engaged at an angle of such obtuseness that with each projection on one of them engaging a cooperating bearing on the other of them, the bearings will function as opposed fulcrums for the projections and grip the projections frictionally under the weight of these components against flattening of the angular relationship and against slipping apart, so that the components by virtue of said projections and bearings constitute a self-supporting structure, each frame at its outer edge having an integral downward wall-forming component or skirt adapted to provide head room to the outer edges of the frame when at said obtuse angle.

12. An arched cover structure for plants comprising three or more frames adapted for inter-attachment with edge in proximity to edge to form a series making an arched structure when supported at the outer edges, the outer frames of the series forming wall components adapted to support the intermediate frame or frames, which constitute roof-forming components, high enough to provide the required headroom throughout the area of the roof, said frames having spaced along their adjoining edges projections and bearings whereby the frames can be withdrawably engaged edge to edge with the projections crossing or intermeshing and each projection on one frame engaging the corresponding bearing on the adjoining frame, the bearings being disposed to form opposing fulcrums for the projections so that when said bearings are engaged by the corresponding projections the adjoining frames contain an angle of such obtuseness that the projections and bearings and thus the frames are frictionally gripped or locked together in resisting relative angular flattening movement of the frames under the effect of the weight thereof and of such obtuseness that the outer supported frames of the series slope inwards from the lower edges to prevent sideward collapse of the structure.

13. A frame for edge to edge attachment to form an arched cover structure for plants or the like and having projections and bearings spaced along opposed edges whereby the frame can be withdrawably engaged at its opposed edges with the edges of complementary frames and with its projections intermeshing or crossing the projections of the complementary frames and in engagement with the corresponding bearings thereof and its bearings engaged by the projections on the complementary frames, the projections and bearings of said frame being so disposed that when they are respectively in engagement with the bearings and projections of the complementary frames the angle contained by any two adjoining frames is of such obtuseness that the projections and bearing surfaces and thus the frames are frictionally gripped or locked together in resisting angular flattening movement of the frames under the effect of the weight of the frames.

14. A frame as claimed in claim 13, comprising longitudinal members and transverse members which are extended at their ends beyond the longitudinal members to form the projections.

15. A frame as claimed in claim 13, comprising longitudinal members and transverse members which are extended beyond the longitudinals to form projections at both ends of less width than the transverse members and the latter have inclined bearing surfaces at the foot of said projections, the projection and bearing surface at one end of a member being disposed at opposite sides to those at the other end so that either edge of a frame may be interlocked with either edge of another.

16. A frame as claimed in claim 13, comprising longitudinal members of which consecutive or alternate transverse members are extended beyond the longitudinals at opposite ends to form the projections and the other ends are chamfered to form the bearing surfaces.

17. Cover means for plants comprising a plurality of identical frames each comprising spaced longitudinals and spaced transverse members which are extended beyond the longitudinals to form projections at opposite edges of the frame of lesser width than the transverse members and which have bearing surfaces formed at the foot of the projections, the frames being withdrawably engageable together at said edges so that the projections and bearing surfaces engage scissorwise with the ends of the frames flush or in the same plane and detachably lock the frames when supported at their remote edges against collapse or flattening movement beyond an obtuse angle and against slipping apart so that the frames form a self-supporting bridge-like or roof-like structure capable of being engaged endwise with a similar structure without spaces between the structures, the part width extensions and bearing surfaces at opposite edges of the frame and the bearing surfaces being positioned to give a predetermined angle of substantially less than 180° so that at least three frames can be detachably interlocked to form a self-supporting and locking bridge-like structure with the two ground-engaging frames sloped inwardly from their lower edge.

18. For a covering structure which comprises a plurality of endwise abutting rooflike structures forming a continuous structure, walls for closing the structure and clamping means detachably clamping the end walls and the rooflike structures together, the rooflike structures each comprising a plurality of sheet-receiving frames having interconnectable edges and complementary interlocking means at said edges whereby three or more frames can be separably attached edge to edge with two of them engaging the ground and sloped inwardly from their lower edges; a sheet-receiving frame consisting of two spaced longitudinals and two spaced transverse members, the latter being extended and shaped at the ends to form part-width projections and inclined bearing surfaces at the foot of the projections adapted to engage scissorwise with corresponding projections and bearing surfaces on a corresponding frame to detachably interlock the two last-mentioned frames against flattening movement beyond an angle of less than 180°.

19. A sheet-receiving frame as claimed in claim 18, in which the two spaced longitudinals have outer edges that are chamfered to engage flatly with corresponding outer edges of an adjacent similar frame when both frames are interlocked at said angle, and in which the longitudinals also have ends projecting beyond the bearing surfaces on the transverse members of the first-mentioned frame to constitute notches which receive the projections of said adjacent frame and prevent relative longitudinal movement between the frames.

JOHN FERGUSON STEVENSON.

REFERENCES CITED

The following references are of record in the file of this patent:

UNITED STATES PATENTS

| Number | Name | Date |
|---|---|---|
| 1,221,664 | Boyer | Apr. 3, 1917 |
| 1,738,363 | Edwards | Dec. 3, 1929 |
| 1,960,001 | Davies | May 22, 1934 |
| 2,122,005 | Foley | June 28, 1938 |
| 2,200,706 | Slater | May 14, 1940 |
| 2,264,290 | Blain | Dec. 2, 1941 |

FOREIGN PATENTS

| Number | Country | Date |
|---|---|---|
| 545,034 | Germany | Feb. 29, 1932 |
| 18,427 | Great Britain | 1888 |
| 17,648 | Great Britain | 1914 |